(12) United States Patent
Black et al.

(10) Patent No.: US 9,647,740 B1
(45) Date of Patent: May 9, 2017

(54) PROXIMAL USER DETECTION WITH A COMPLEX MEASUREMENT RECEIVER

(71) Applicant: MOTOROLA MOBILITY LLC, Chicago, IL (US)

(72) Inventors: Gregory Black, Vernon Hills, IL (US); Dale Schwent, Schaumburg, IL (US); Andrew Pavacic, Mundelein, IL (US); Armin Klomsdorf, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/333,777

(22) Filed: Oct. 25, 2016

(51) Int. Cl.
| H04B 7/00 | (2006.01) |
| H04B 7/06 | (2006.01) |
| H04W 52/24 | (2009.01) |
| H04B 7/08 | (2006.01) |
| H04B 7/0404 | (2017.01) |
| H04W 52/16 | (2009.01) |
| H04B 7/024 | (2017.01) |

(52) U.S. Cl.
CPC .......... *H04B 7/0608* (2013.01); *H04B 7/024* (2013.01); *H04B 7/0404* (2013.01); *H04B 7/0802* (2013.01); *H04B 7/0808* (2013.01); *H04B 7/0825* (2013.01); *H04W 52/16* (2013.01); *H04W 52/24* (2013.01); *H04W 52/246* (2013.01)

(58) Field of Classification Search
CPC .. H04B 7/0608; H04B 7/0802; H04B 7/0404; H04B 7/0825; H04B 7/024; H04W 52/24; H04W 52/246; H04W 52/16

USPC .............................. 455/68–70, 522; 370/318
See application file for complete search history.

(56) References Cited

U.S. PATENT DOCUMENTS

| 6,961,368 | B2 * | 11/2005 | Dent .................. H03F 3/24 375/219 |
| 2010/0286686 | A1 * | 11/2010 | Hancock .............. A61B 18/18 606/33 |
| 2014/0021796 | A1 * | 1/2014 | Song .................. H01F 38/14 307/104 |
| 2015/0077280 | A1 * | 3/2015 | Park .................. H03M 1/38 341/156 |

* cited by examiner

*Primary Examiner* — Dominic Rego
(74) *Attorney, Agent, or Firm* — Yudell Isidore PLLC

(57) ABSTRACT

A method, communication device, and computer program product mitigates Specific Absorption Rating (SAR) exposure to a user who is proximate to a communication device. The method includes an on-device measurement receiver of a communication device detecting a first complex reflected signal corresponding to transmit signals that are reflected by a first antenna. The method includes a controller determining a pair of first complex return loss values based on a first complex transmit power signal and the first complex reflected signal. The method includes the controller determining whether both the first complex return loss values differ from respective baseline values by respective Specific Absorption Rate (SAR) threshold amounts. In response to the controller determining that both the first complex return loss values differ by the respective SAR threshold amounts, the controller reduces an output power level of a transceiver that delivers power to the first antenna.

20 Claims, 5 Drawing Sheets

US 9,647,740 B1

PROXIMAL USER DETECTION WITH A COMPLEX MEASUREMENT RECEIVER

TECHNICAL FIELD

The present disclosure generally relates to user proximity detection by a communication device and more particularly to detecting and mitigating Specific Absorption Rate (SAR) exposure to a user of the communication device.

DESCRIPTION OF THE RELATED ART

Regulatory requirements for Specific Absorption Rate (SAR) in body-worn user position cases for mobile devices are making antenna design increasingly difficult. In addition, there are now SAR performance requirements for Wireless Local Access Network (WLAN) access points ("mobile hot spot" devices), and for devices with display sizes greater than 6" (e.g., tablet devices). For these requirements, the SAR is measured in a slab of material ("flat phantom") having dielectric properties representative of the human body, with the device in various orientations (e.g. front or back) at a distance of 10 mm or less. Accordingly, in today's products, when a proximal user position, such as a body-worn position, is detected, the transmitter output power is reduced such that the SAR does not exceed the regulatory limits. The tests for compliance with these requirements include a SAR measurement with a limit of 1.2 W/Kg in a 1 g average at 10 mm spacing. If that limit is exceeded, then there is a second measurement with a limit of 4 W/Kg in a 10 g average at 0 mm spacing.

Today's devices employ capacitive sensors to detect the body-worn position. The same capacitive sensors are used in adaptive antenna impedance matching to detect antenna impedance changes associated with the free space (FS) case and user position cases, such as the Beside-Head (BH) and the beside-head with hand (BHH) cases. In this way, the antenna matching circuit can be adjusted to improve the Total Radiated transmit Power (TRP) and Total Integrated Sensitivity (TIS). In existing products, capacitive sensors are used to detect various user positions for several purposes, including SAR reduction and adaptive antenna impedance matching for TRP and TIS improvement.

BRIEF DESCRIPTION OF THE DRAWINGS

The description of the illustrative embodiments is to be read in conjunction with the accompanying drawings, wherein.

DETAILED DESCRIPTION

Figure 1:
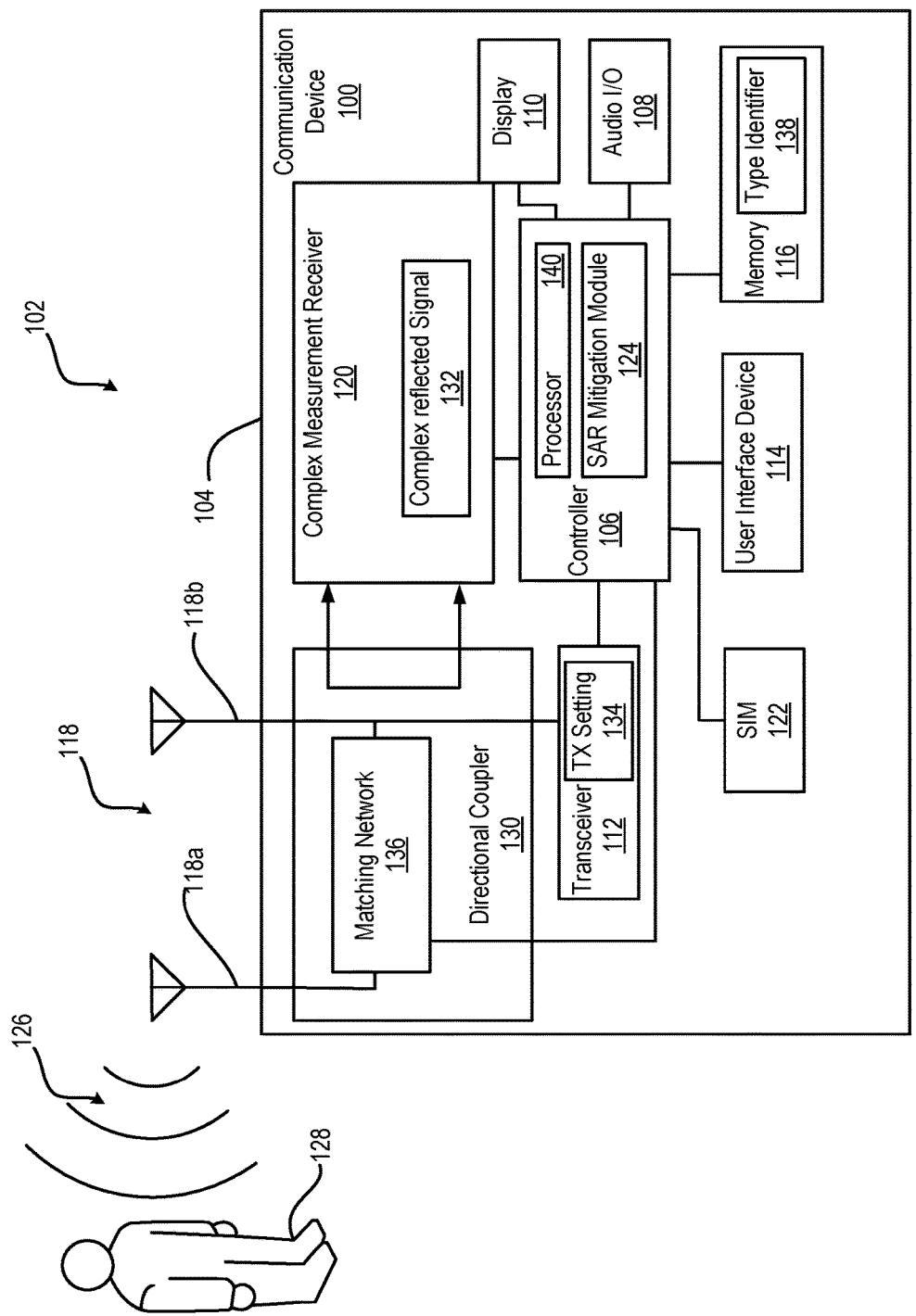
FIG. 1 illustrates a block diagram of a communication device having a complex Return Loss (RL) measurement receiver for mitigating Specific Absorption Rate (SAR) exposure to a user, according to one or more embodiments.

The present innovation provides a method, communication device, and computer program product for mitigating Specific Absorption Rating (SAR) exposure to a user who is proximate to a communication device. The method includes detecting, via an on-device measurement receiver of a communication device, a first complex reflected signal corresponding to transmit signals that are reflected by a first antenna. The method includes a controller determining a pair of first complex return loss values based on a first complex transmit power signal and the first complex reflected signal. Additionally, the method includes the controller determining whether both of the pair of first complex return loss values differ from respective baseline values by respective Specific Absorption Rate (SAR) threshold amounts. In response to the controller determining that both of the first complex return loss values differ by the respective SAR threshold amounts, the controller reduces an output power level of a transceiver that delivers power to the first antenna.

The communication device includes a first antenna, a transceiver in communication with the first antenna and which delivers power to at least the first antenna, and an on-device complex measurement receiver that detects a first complex reflected signal corresponding to transmit signals being reflected by a first antenna. A controller is provided in communication with the transceiver and the on-device complex measurement receiver. The controller compares a first complex transmit power signal to the first complex reflected signal to determine a pair of first return loss values. The controller determines whether both of the pair of first return loss values differ from respective baseline values by respective SAR threshold amounts that indicate an exceedance of a SAR. In response to the controller determining that both of the first return loss values differ by the respective SAR threshold amounts, the controller reduces the power delivered to the first antenna by the transceiver. In one embodiment, the controller adjusts the power delivered to the first antenna by detuning an antenna matching circuit that delivers variable power to the first antenna.

The program product includes a controller-readable storage device having stored thereon program code that, when executed, configures a controller of a communication device having at least a first antenna. The controller is in communication with a transceiver that provides power to the first antenna and with an on-device measurement receiver. The program code configures the controller to perform executable operations that includes: (a) receiving from the on-device complex measurement receiver, a first complex reflected signal that is detected by the on-device complex measurement receiver and which corresponds to transmit signals being reflected by a first antenna; (b) comparing a first complex transmit power signal to the first complex reflected signal to determine a first pair of complex return loss values; (c) determining whether both values from among the first pair of complex return loss values differ from respective baseline values by corresponding threshold amounts that indicate an exceedance of a SAR; and (d) in response to determining that the first return loss values differ by the respective SAR threshold amounts, reducing the power delivered to the first antenna. In one embodiment, the controller adjusts the power delivered to the first antenna by detuning an antenna matching circuit that delivers variable power to the first antenna.

According to one aspect of the disclosure, the capacitive sensors are being replaced by a more accurate complex measurement receiver method of detecting antenna impedance changes, for adaptive impedance matching purposes. The complex measurement receiver can directly measure the signals going into and out of the antenna to more accurately determine Total Radiated transmit Power (TRP) and Total Integrated Sensitivity (TIS). The present innovation completely eliminates the capacitive sensor and provides an alternative method of detecting the body-worn position, for purposes of reducing the transmit power, such that the SAR does not exceed regulatory limits. Aspects of the disclosure capitalizes on the fact that newer transceiver devices have the ability to measure complex input and reflected signal levels at the matching circuit input.

The present innovation uses a complex measurement receiver to detect and correct for high SAR. In addition, the same complex measurement receiver is used for adaptive antenna impedance matching. In this way, the communication device can have low SAR and good TIS and TRP, and the communication device uses a single complex measurement receiver for both functions, which reduces cost and complexity. A controller of the communication device can use the complex measurement receiver to detect complex return loss values exceeding respective return loss thresholds for SAR. If the return loss thresholds for SAR are exceeded, then the transmitted power is reduced. The transmitted power can be reduced either in the conventional way, by reducing the signal power from the transceiver into the antenna matching circuit, or by controlling the antenna matching circuit to reduce the power delivered into the antenna. In this way the complex measurement receiver can be used to detect various levels of antenna impedance mismatch. At lower threshold levels, the impedance matching circuit can be controlled to improve the TRP or TIS. At higher threshold levels, power reduction measures can be employed to reduce SAR. The power reduction measures can include reducing power from the transceiver into the adaptive impedance matching circuit, controlling the adaptive impedance matching circuit to reduce the power delivered to the antenna, and shifting power delivery to another antenna. In this way, the device can employ a single complex measurement receiver apparatus for SAR reduction and adaptive antenna impedance matching, thereby eliminating a separate capacitive sensor.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific components, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Turning now to FIG. 1, there is depicted a block diagram representation of an example communication device 100 within which several of the features of the disclosure can be implemented. Communication device 100 can be one of a host of different types of devices, including but not limited to, a mobile cellular phone or smart-phone, a laptop, a net-book, an ultra-book, a networked smart watch or networked sports/exercise watch, and/or a tablet computing device or similar device that can include wireless communication functionality. As a device supporting wireless communication, communication device 100 can be one of, and also be referred to as, a system, device, subscriber unit, subscriber station, mobile station (MS), mobile, mobile device, remote station, remote terminal, user terminal, terminal, communication device, user agent, user device, cellular telephone, a satellite phone, a cordless telephone, a Session Initiation Protocol (SIP) phone, a wireless local loop (WLL) station, a personal digital assistant (PDA), a hand-held device having wireless connection capability, a computing device, or other processing devices connected to a wireless modem. These various devices all provide and/or include the necessary hardware and software to support the various wireless or wired communication functions as part of a communication system 102. Communication device 100 can also be an over-the-air link in communication system 102 that can be intended to be portable or hand-held or for which a user can move into close proximity. Examples of such communication devices include a wireless modem, an access point, a repeater, a wirelessly-enabled kiosk or appliance, a femtocell, a small coverage area node, and a wireless sensor, etc.

In one or more embodiments, communication device 100 can include a housing 104, within which can be located controller 106, audio input and output (I/O) component 108, a display 110, a transceiver 112, a user interface device 114, a memory 116, one or more antennas 118 coupled to transceiver 112, and a removable subscriber identity module (SIM) 122 coupled to controller 106. The communication device 100 can include a SAR mitigation module 124 coupled to or included within controller 106. In alternate embodiments, the SAR mitigation module 124 can reside within controller 106, can reside within memory 116, can be autonomous modules, software, hardware, programmable logic, or can be implemented in any other format useful for a module on a wireless communication device 100. The SAR mitigation module 124 can be an application or set of instructions stored in memory 116 and executed within a processor 140 of controller 106.

Display 110 can be a liquid crystal display (LCD), a light emitting diode (LED) display, a plasma display, or any other means for displaying information. Transceiver 112 may include a transmitter and/or a receiver. Audio input and output circuitry 108 can include a microphone, a speaker, a transducer, or any other audio input and output circuitry. User interface device 114 can include a keypad, buttons, a touch pad, a joystick, an additional display, or any other device useful for providing an interface between a user and an electronic device. Memory 116 may include a random access memory, flash memory, a read only memory, an optical memory or any other memory that can be coupled to or within a wireless communication device.

In one or more embodiments, communication device 100 includes at least a first antenna 118a that transmits a transmit signal 126 for which SAR mitigation for a user 128 is achieved through use of a complex measurement receiver 120. Transceiver 112 is in communication with first antenna 118a and delivers power to at least first antenna 118a. A directional coupler 130 can be communicatively coupled between first antenna 118a and transceiver 112 to provide for two-way communication over first antenna 118a. Communication device 100 includes an on-device measurement receiver 120 that detects a first complex reflected signal 132 that corresponds to transmit signals being reflected by first antenna 118a.

Controller 106, which is in communication with transceiver 112 and on-device complex measurement receiver 120, determines a first pair of complex return loss values by comparing (i) a pair of values representing a complex signal corresponding to a first transmit power setting 134 to (ii) a pair of values representing first complex reflected signal 132. Controller 106 determines whether both of the first complex return loss values differ from respective baseline values by at least respective SAR threshold amounts. More specifically, when both of the first complex return loss values differ from respective baseline values by at least respective SAR threshold amounts, controller 106 receives indication that an excessive amount of SAR is generated. The SAR threshold amounts that are identified by controller 106 are dependent on the type of power efficiency parameter (e.g., complex return loss) being utilized. In response to controller 106 determining that both of the first return loss values differ from the respective baseline values by at least the SAR threshold amounts, controller 106 reduces the power delivered to first antenna 118a by transceiver 112. For example, controller 106 can reduce an output power level of the transceiver 112 by changing the transmit power setting 134 to reduce the power delivered to the first antenna 118a. As another example, the controller 106 can detune the impedance matching network 136 to reduce power delivered to the first antenna 118a.

In one or more embodiments, the threshold differences of complex return loss can be associated with the type identifiers of the communication device. The controller 106 determines or retrieves a type identifier 138 for the communication device 100, such as from data stored in memory 116. The controller 106 can then determine the threshold differences of complex return loss associated with the type identifier 138.

In one or more embodiments, the communication device 100 includes at least two antennas 118, e.g., first antenna 118a and second antenna 118b, that each transmits all or a portion of transmit signal 126, with the portions selectably apportioned by an impedance matching network 136. Transmitting on two or more antennas 118 can support spatial diversity, SAR mitigation, etc. In these embodiments, complex measurement receiver 120 can be used to measure the complex return loss for at least two antennas 118 for SAR mitigation for the user 128. On-device complex measurement receiver 120 can further detect a second complex reflected signal 132 that corresponds to transmit signals being reflected by the second antenna 118b of communication device 100. Controller 106 compares (i) a pair of values representing a complex signal corresponding to second transmit power setting 134 to (ii) a pair of values representing second complex reflected signal 132 to determine a second pair of complex return loss values. Controller 106 can fully shift, or switch, the power delivered respectively between first and second antennas 118a, 118b. In an embodiment, controller 106 can shift a portion of the power based, at least in part, on adaptive antenna impedance matching of the first and second pair of complex return loss values. Controller 106 determines whether either of the first or second pair of complex return loss values differs from its respective pair of baseline values by at least respective SAR threshold amounts. In response to the controller 106 determining that either of the first or second pair of return loss values differs by at least the respective threshold amounts, the controller 106 reduces the power delivered to the corresponding first and/or second antenna 118a, 118b. For example, the controller 106 can reduce an output power level of the transceiver 112 by changing the transmit power setting 134 to reduce the power delivered to either or both of the first and second antennas 118a, 118b. As another example, the controller 106 can detune the impedance matching network 136 to reduce power delivered to either or both of the first and second antennas 118a, 118b.

An investigation has shown that the complex measurement receiver 120 can be an effective source for detecting SAR exposure. The investigation explored matching circuit design considerations that enable these signal measurements to replace user position sensors. In particular, the investigation focused on Return Loss (RL) measurements. RL is defined by the ratio, in dB units, of the input power to the reflected power, resulting in a positive number. For clarity, positive return loss is used by default. However, conventionally, return loss is expressed as a negative number. The ratio of reflected to incident power results in the negative RL. Hereafter, an apostrophe is used to indicate negative RL.

$$RL(dB) = 10 * Log_{10}[P_{INPUT}/P_{REFLECTED}]$$

$$RL'(dB) = \text{negative return loss}$$

$$= 10 * Log_{10}[P_{REFLECTED}/P_{INPUT}]$$

There are two effects that cause a change in RL when the device is placed in a body-worn position. Firstly, when a lossy body comes in close proximity to the antenna, the RL of the antenna tends to go up, which can be referred to as the body dissipation effect. Secondly, if the antenna is driven via a well-designed matching circuit, there is a countervailing tendency for the RL to go down, especially if the bandwidth is narrow, which can be referred to as the mismatch effect. The mismatch effect only causes the RL to go down if the matching circuit is designed for maximum return loss in a non-body-worn position such as free space. Adjusting the design for maximum return loss in the body-worn position causes the RL to go up. In this way, when the device is moved to the body-worn position, the design can make both effects, the dissipation and mismatch effects, move the RL in the same direction.

Designing for maximum RL in a body worn position can be helpful for achieving good overall field performance with varying user positions for frequency division duplex (FDD) operation having the receive frequency higher than the transmit frequency. This is because the RL maximum in Free Space (FS) or light hand-grip positions tends to be at higher operating frequency. In contrast, the RL maximum in user positions with more antenna loading, such as BHH, tends to be at lower operating frequency. Advantageously, the light hand grip and FS positions are more likely to occur in standby operation when receive performance is more important. For a few FDD band pairs, such as the $3^{rd}$ generation partnership program (3GPP) band 13 and band 20, the receive frequencies are below the transmit frequencies. In these bands it can be better for overall field performance to design for maximum RL in the FS or light hand grip position. For these bands, when the device is moved to the body-worn position, the mismatch effect would typically cause the RL to go down (despite a countervailing dissipation effect). Thus, when the controller 106 determines whether both of the first return loss values differ from the respective baseline values by at least the SAR exceedance threshold amounts, the threshold amounts can be either a positive and/or a negative threshold amount, depending on the matching network 136 design and band(s) of operation.

Figure 2:
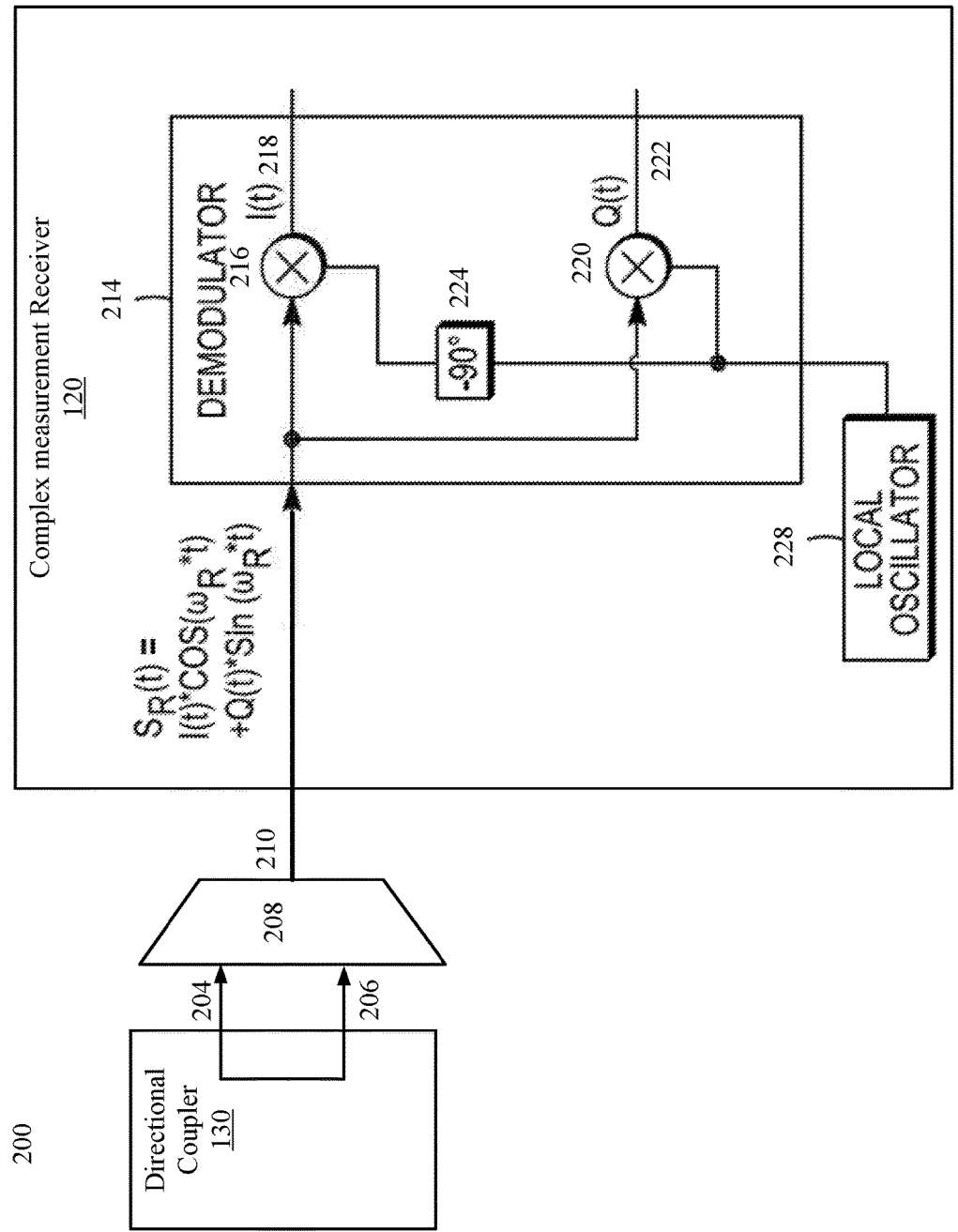
FIG. 2 illustrates a block diagram illustrating a complex measurement receiver, according to one or more embodiments.

FIG. 2 provides a block diagram illustrating a detection module having a complex measurement receiver, according to one or more embodiments. Detection module 200 comprises directional coupler 130 and multiplexer 208. As illustrated, directional coupler 130 provides/outputs complex forward signal "Sf(t)" 204 and complex reverse/reflected signal "Sr(t)" 206, which are received by multiplexer 208. In addition, detection module 200 comprises complex measurement receiver 120 which is coupled to an output of multiplexer 208. Complex measurement receiver 120 comprises demodulator 214 and local oscillator 228, which is coupled to demodulator 214. Demodulator 214 comprises first downconverter 216 and second downconverter 220. In addition, demodulator 214 comprises (−90 degree) phase shifter 224 which is coupled between first downconverter 216 and local oscillator 228. Local oscillator 228 is communicatively coupled to second downconverter 220.

Multiplexer 208 provides complex forward signal "Sf(t)" 204 and complex reverse/reflected signal "Sr(t)" 206 in alternating time instants to complex measurement receiver 120, which alternately downconverts complex forward signal "Sf(t)" 204 and complex reverse/reflected signal "Sr(t)" 206. For example, detection module 200 illustrates complex reverse/reflected signal 206 being applied by multiplexer 208 (during a corresponding time instant) to demodulator 214.

Controller 106 (FIG. 1) receives the (baseband/demodulated) first complex reflected signal from complex measurement receiver 120. In one embodiment, the demodulated first complex reflected signal comprises an in-phase component "I(t)" 218 and a quadrature component "Q(t)" 222. Controller 106 determines a pair of values representing a first complex signal corresponding to first transmit power setting 134 (FIG. 1). In addition, controller 106 determines a pair of values representing complex reflected signal 206. Controller 106 compares (i) the pair of values representing the first complex signal corresponding to the transmit power setting 134 (FIG. 1) to (ii) the pair of values representing the first complex reflected signal to determine a resulting pair of values representing a complex power efficiency parameter, such as first values representing a complex return loss.

According to one or more embodiments, a transmit power setting is used to provide the complex transmit power signal, which can be provided by the forward signal from the directional coupler. Thus, the transmit power setting can be controlled in a closed loop manner by measuring the forward signal from the directional coupler. According to another embodiment, the transmit power setting is a parameter that controls the output power level out of the transceiver. As a result, the transmit power setting can be based on a transmitter control level.

Controller 106 determines whether both of the first values for complex return loss (which are also referred to herein as the first set of complex return loss values) differ from respective baseline values by respective SAR threshold amounts that indicate an exceedance of SAR. In particular, controller 106 determines whether both (a) a first value, from the first set of complex return loss values, differs from a first baseline value by at least a first SAR threshold amount and (b) a second value, from the first set of complex return loss values, differs from a second baseline value by at least a second SAR threshold amount. In response to determining that both the first value and the second value differ from the respective first and second baseline values by at least the first and second SAR threshold amounts, controller 106 adjusts the power delivered to first antenna 118a based on respective differences between the first and second values and the first and second baseline values. In one or more embodiments, controller 106 adjusts the power to first antenna 118a by reducing an output power level of transceiver 112 and/or by changing the transmit power setting 134 to reduce the power delivered to first antenna 118a.

In one or more related embodiments, adjusting the power delivered to first antenna 118a includes detuning antenna matching circuit 136 that delivers variable power to first antenna 118a. According to one or more aspects, adjusting the power delivered to first antenna 118a can include shifting power delivered from first antenna 118a to second antenna 118b of communication device 100.

According to one or more aspects, controller 106 detects, by on-device complex measurement receiver 120, a second complex reflected signal corresponding to transmit power that is reflected from second antenna 118*b* of communication device 100, and controller 106 compares a second complex transmit power signal to the second complex reflected signal to determine a second set of values for a complex power efficiency parameter. The second set of values are a pair of values that are identified as (i) a third value and (ii) a fourth value.

As previously described, controller 106 determines, using the first set of values whether both (i) the first value differs from the first baseline value by at least the first SAR threshold amount and (ii) the second value differs from the second baseline value by at least the second SAR threshold amount. Controller 106 then determines, using the second set of values whether both (i) the third value differs from a third baseline value by at least a third SAR threshold amount and (ii) the fourth value differs from a fourth baseline value by at least a fourth SAR threshold amount.

In response to both values being different from the respective baseline amounts by at least the respective SAR threshold amounts for only one of the first set of values and the second set of values, controller 106 shifts/adjusts power allocated/delivered to the antenna having values that both differ from the respective baseline values by the respective SAR threshold amounts from that antenna to the other antenna. However, in response to both values being different from the respective baseline amounts by at least the respective SAR threshold amounts for both of the first set of values and the second set of values, controller 106 reduces the power delivered to both (i) the first antenna corresponding to the first set of values; and (ii) the second antenna corresponding to the second set of values. Accordingly, power to each antenna is reduced by an amount corresponding to differences between the respective values and the corresponding baseline values.

In one implementation, the complex power efficiency parameter is a complex return loss metric. According to one or more aspects, the complex power efficiency parameter value corresponds to one of a complex reflection coefficient and an impedance value. The first and second values represent one of (i) magnitude and phase of the complex power efficiency parameter and (ii) real and imaginary values of the complex power efficiency parameter.

According to one embodiment, controller 106 detects one or more user configuration inputs and adjusts the power delivered to the first antenna by an amount that is determined in part based on the user configuration inputs. The one or more user configuration inputs that are detectable by controller 106 include activity associated with one or more of a display, a connector, a headset, a charger, and a proximity sensor.

According to one or more aspects, controller 106 identifies a type identifier for the communication device, and determines, using the type identifier, the first and second SAR threshold amounts corresponding to the complex power efficiency parameter.

Figure 3:
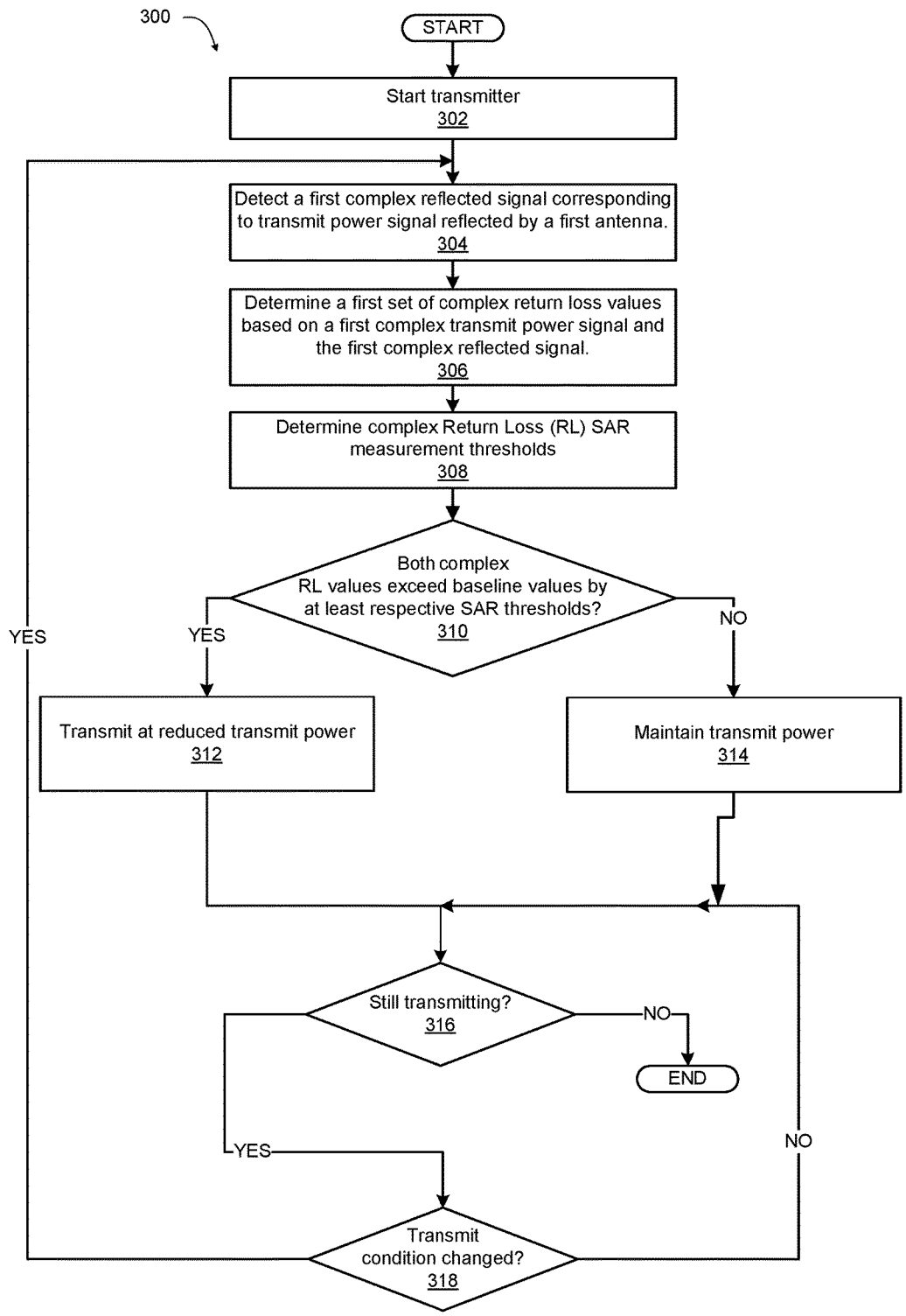
FIG. 3 illustrates a flow diagram of a method of using a complex measurement receiver to mitigate SAR exposure caused by a communication device, according to one or more embodiments.

FIG. 3 illustrates a method 300 of using a complex RL measurement receiver to mitigate SAR exposure caused by a communication device. In one or more embodiments, the method 300 includes a controller initiating signal transmission at a transmitter (block 302). The method 300 includes the controller detecting a first complex reflected signal corresponding to transmit power signal reflected by a first antenna (block 304). Controller 106 then determines a first set of complex return loss values based on a first complex transmit power signal and the first complex reflected signal (block 306). The method 300 includes controller 106 determining (or retrieving) a pair of RL thresholds (block 308).

For example, the RL thresholds can be respective functions of the frequency band of the transmitter. The method 300 further includes controller 106 determining whether both values of a pair of complex RL values exceed respective baseline values by at least respective SAR threshold amounts (decision block 310). In response to the controller determining in decision block 310 that both of the complex RL values exceed the respective baseline values by at least respective SAR threshold amounts, controller 106 adjusts signal transmission via the corresponding antenna (e.g., antenna 118*a*) to a reduced transmit power level (block 312). In response to the controller determining in decision block 310 that at least one of the complex RL values does not exceed the respective baseline value by at least the respective SAR threshold amounts, controller 106 maintains a current transmit power (block 314). After the controller sets/maintains the transmit power in either block 312 or 314, the method 300 includes the controller determining whether the transceiver is still transmitting (decision block 316). In response to the controller determining in decision block 316 that the transceiver is no longer transmitting, the method 300 ends. In response to the controller determining in decision block 316 that the transceiver is still transmitting, the method 300 includes the controller making a further determination as to whether the transmit condition has changed (decision block 318). For example, the transmit condition can be a timer reaching a limit. As another example, the transmit condition can be an input from a sensor as to a physical change in orientation or state. In response to the controller determining in decision block 318 that the transmit condition has not changed, the method 300 returns to decision block 316 to await a change in the transmit condition. In response to the controller determining in decision block 318 that the transmit condition has changed, the method 300 returns to block 304 to make a new measurement for a complex reflected signal.

Figure 4:
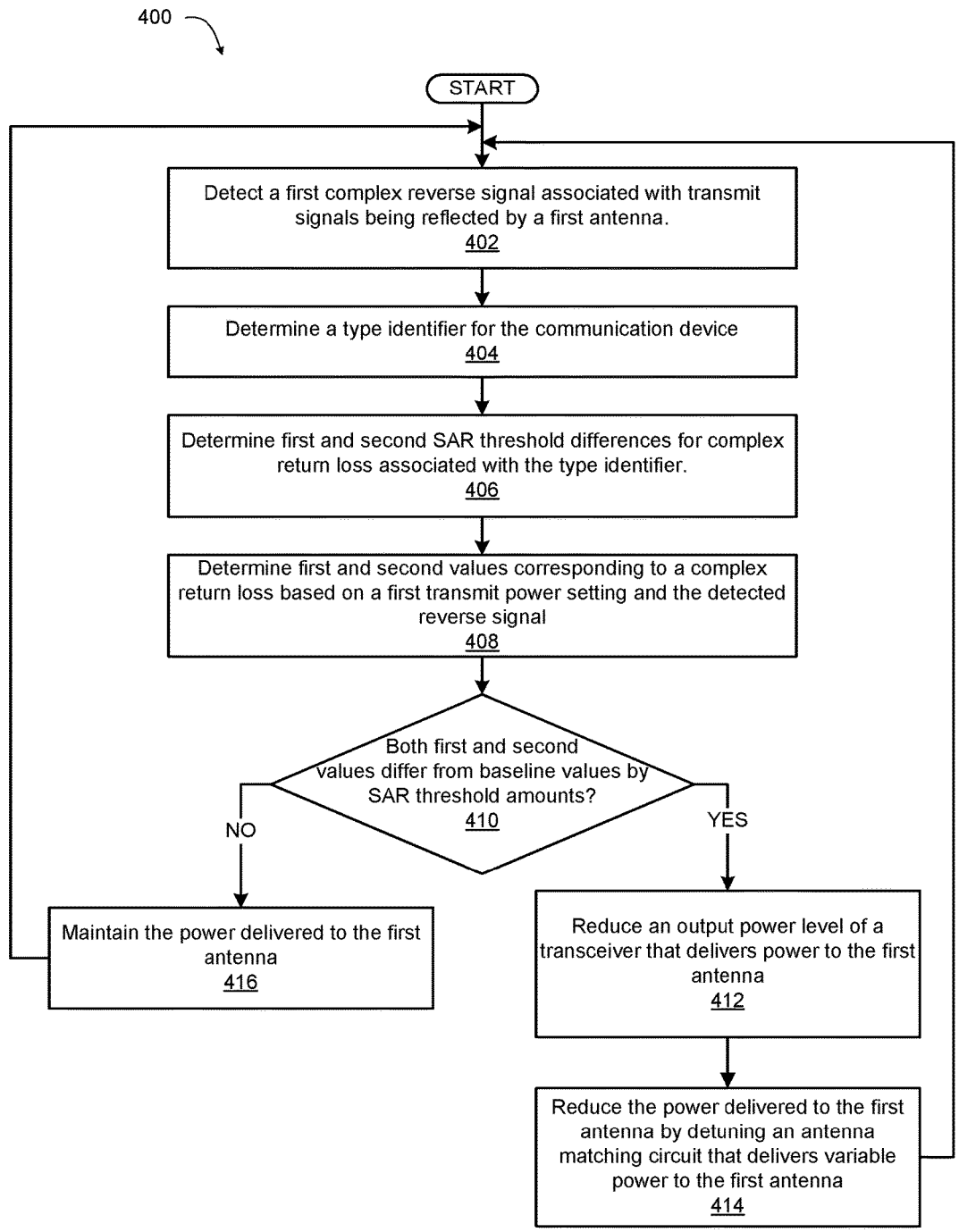
FIG. 4 illustrates a flow diagram of a method for reducing SAR exposure to a user that is proximate to a communication device, according to one or more embodiments.

FIG. 4 illustrates a method 400 of reducing SAR exposure to a user who is proximate to a communication device. In one or more embodiments, the method 400 includes an on-device complex measurement receiver of a communication device detecting a first complex reverse/reflected signal associated with transmit signals that are reflected by a first antenna (block 402). The method 400 includes the controller determining a type identifier for the communication device (block 404). In one embodiment, controller 106 determines the type identifier by retrieving stored type identifier information corresponding to communication device 100. The method 400 includes the controller determining first and second SAR threshold differences for complex return loss associated with the type identifier (block 406). The method 400 includes the controller determining first and second values corresponding to a complex return loss based on a first transmit power setting and the detected complex reverse signal (block 408). The method 400 includes the controller determining whether both first and second values differ from respective baseline values by respective SAR threshold amounts (decision block 410).

In response to determining in decision block 410 that the first and second complex return loss values differ from the respective baseline values by the SAR threshold amounts, the communication device reduces the power delivered to the first antenna. In one or more embodiments, the controller reduces the power delivered to the first antenna by reducing an output power level of a transceiver of the communication device that delivers power to the first antenna (block 412). In alternate embodiments, the controller reduces or further reduces the power delivered to the first antenna by detuning an antenna matching circuit that delivers variable power to the first antenna (block 414). Then method 400 returns to block 402 to continue mitigating SAR exposure. In response to determining in decision block 406 that the first and second complex return loss values do not differ from the respective baseline values by the SAR threshold amounts, the communication device maintains the power delivered to the first antenna (block 416). Then method 400 returns to block 402 to continue mitigating SAR exposure.

Figure 5:
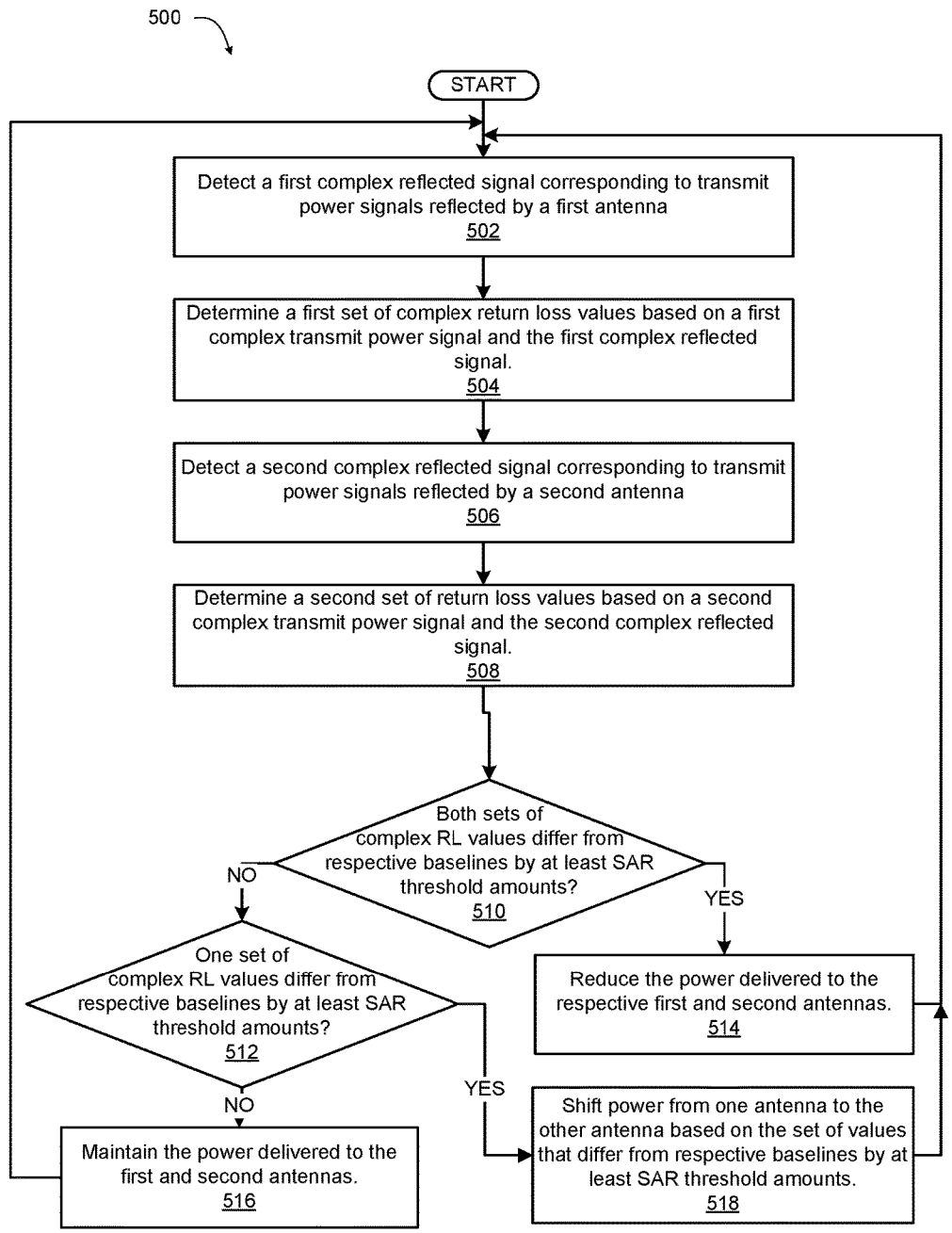
FIG. 5 illustrates a flow diagram of a method for reducing SAR exposure to a user that is proximate to a communication device that concurrently uses multiple antennas, according to one or more embodiments.

FIG. 5 illustrates a method 500 of reducing SAR exposure to a user who is proximate to a communication device that concurrently uses multiple antennas. In one or more embodiments, the method 500 includes an on-device complex measurement receiver of a communication device detecting a first complex reflected signal corresponding to transmit power signals reflected by a first antenna (block 502). The method 500 includes a controller determining a first set of complex return loss values, based on a first complex transmit power signal and the first complex reflected signal (block 504). The method 500 includes the on-device complex measurement receiver detecting a second complex reflected signal corresponding to transmit power signals reflected by a second antenna (block 506). The method 500 includes the controller determining a second set of return loss values, based on a second complex transmit power signal and the second complex reflected signal (block 508). The method 500 includes the controller determining whether both of the first and second sets of return loss values differ from respective baseline values by respective SAR threshold amounts that indicate an exceedance of SAR (decision block 510). In response to determining in decision block 510 that both of the first and second sets of return loss values differ from the respective baseline values by the respective SAR threshold amounts, the method 500 includes the controller respectively reducing the power delivered to the first and second antennas (block 514). Then method 500 returns to block 502 to continue mitigating SAR exposure. In response to determining in decision block 510 that both of the first and second sets of return loss values do not differ from the respective baseline values by the respective SAR threshold amounts, the method 500 includes the controller determining whether one of the first and second sets of return loss values differs from respective baseline values by respective SAR threshold amounts (decision block 512). In response to determining in decision block 512 that one of the first and second sets of return loss values differs from the respective baseline values by the respective SAR threshold amounts, the method 500 includes the controller respectively shifting power from one antenna to the other antenna based on the set of values that differ from respective baselines by at least the SAR threshold amounts (block 518). However, in response to determining in decision block 512 that none of the first and second sets of return loss values differs from the respective baseline values by the respective SAR threshold amounts, the method 500 includes the controller maintaining the power delivered to the respective first and second antennas (block 516). Then method 500 returns to block 502 to continue mitigating SAR exposure.

In the above described flow charts of FIGS. 3-5, one or more of the methods may be embodied in an automated controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
   detecting, by an on-device measurement receiver of a communication device, a first complex reflected signal corresponding to transmit signals that are reflected by a first antenna;
   determining a first set of values for a complex power efficiency parameter including (i) a first value and (ii) a second value, based on a first complex transmit power signal and the first complex reflected signal;
   determining whether both (a) the first value differs from a first baseline value by at least a first Specific Absorption Rate (SAR) threshold amount and (b) the second value differs from a second baseline value by at least a second SAR threshold amount; and
   in response to determining that the first value and the second value respectively differs from the first and second baseline values by at least the first and second SAR threshold amounts, adjusting the power delivered to the first antenna based on respective differences between the first and second values and the first and second baseline values, wherein adjusting the power to the first antenna includes reducing an output power level of a transceiver that delivers power to the first antenna.

2. The method of claim 1, wherein adjusting the power delivered to the first antenna includes detuning an antenna matching circuit that delivers variable power to the first antenna.

3. The method of claim 1, wherein adjusting the power delivered to the first antenna includes shifting power delivered from the first antenna to a second antenna of the communication device.

4. The method of claim 1, further comprising:
   detecting, by the on-device measurement receiver, a second complex reflected signal corresponding to transmit power that is reflected from a second antenna of the communication device;
   comparing a second complex transmit power signal to the second complex reflected signal to determine a second set of values for the complex power efficiency parameter, the second set of values including (i) a third value and (ii) a fourth value;
   determining, using the first set of values whether both (i) the first value differs from the first baseline value by at least the first SAR threshold amount and (ii) the second value differs from the second baseline value by at least the second SAR threshold amount;
   determining, using the second set of values whether both (i) the third value differs from a third baseline value by at least the third SAR threshold amount and (ii) the fourth value differs from a fourth baseline value by at least the fourth SAR threshold amount;
   in response to both values being different from the respective baseline amounts by at least the respective SAR threshold amounts for only one of the first set of values and the second set of values, shifting power delivered from an antenna corresponding to the values that both differ from the respective baseline values by the respective SAR threshold amounts to the other antenna; and
   in response to both values being different from the respective baseline amounts by at least the respective SAR threshold amounts for both of the first set of values and the second set of values, reducing the power delivered to at least one of (i) the first antenna corresponding to the first set of values; and (ii) the second antenna corresponding to the second set of values, wherein power to an antenna is reduced by an amount corresponding to differences between the respective values and the corresponding baseline values.

5. The method of claim 1, wherein the complex power efficiency parameter is a complex return loss metric.

6. The method of claim 1, wherein the complex power efficiency parameter corresponds to one of a complex reflection coefficient and an impedance.

7. The method of claim 1, wherein the first and second values represent one of (i) magnitude and phase of the complex power efficiency parameter and (ii) real and imaginary values of the complex power efficiency parameter.

8. The method of claim 1, further comprising:
   identifying a type identifier for the communication device; and
   determining, using the type identifier, the first and second threshold amounts corresponding to the complex power efficiency parameter.

9. The method of claim 1, further comprising:
   detecting one or more user configuration inputs; and
   adjusting the power delivered to the first antenna by an amount depending on the user configuration inputs;
   wherein user configuration inputs include activity associated with one or more of: a display; a connector; a headset; a charger; and a proximity sensor.

10. A communication device comprising:
    a first antenna;
    a transceiver in communication with the first antenna and which delivers power to at least the first antenna;
    an on-device measurement receiver that detects first signal attribute values including a first signal level that corresponds to the power delivered to a first antenna;
    a controller in communication with the transceiver and the on-device measurement receiver, and which:
      detects, by the on-device measurement receiver of a communication device, a first complex reflected signal corresponding to transmit signals that are reflected by a first antenna;
      determines a first set of values for a complex power efficiency parameter including (i) a first value and (ii) a second value, based on a first complex transmit power signal and the first complex reflected signal;
      determines whether both (a) the first value differs from a first baseline value by at least a first Specific Absorption Rate (SAR) threshold amount and (b) the second value differs from a second baseline value by at least a second SAR threshold amount; and
      in response to determining that the first value and the second value respectively differs from the first and second baseline values by at least the first and second SAR threshold amounts, adjusts the power delivered to the first antenna based on respective differences between the first and second values and the first and second baseline values, wherein adjusting the power to the first antenna includes reducing an output power level of a transceiver that delivers power to the first antenna.

11. The device of claim 10, wherein the controller detunes an antenna matching circuit that delivers variable power to the first antenna to adjust the power delivered to the first antenna.

12. The device of claim 10, wherein the controller shifts power delivered from the first antenna to a second antenna of the communication device to adjust the power delivered to the first antenna.

13. The device of claim 10, wherein the controller:
   detects, by the on-device measurement receiver, a second complex reflected signal corresponding to transmit power that is reflected from a second antenna of the communication device;
   compares a second complex transmit power signal to the second complex reflected signal to determine a second set of values for the complex power efficiency parameter, the second set of values including (i) a third value and (ii) a fourth value;
   determines, using the first set of values whether both (i) the first value differs from the first baseline value by at least the first SAR threshold amount and (ii) the second value differs from the second baseline value by at least the second SAR threshold amount;
   determines, using the second set of values whether both (i) the third value differs from a third baseline value by at least the third SAR threshold amount and (ii) the fourth value differs from a fourth baseline value by at least the fourth SAR threshold amount;
   in response to both values being different from the respective baseline amounts by at least the respective SAR threshold amounts for only one of the first set of values and the second set of values, shifts power delivered from an antenna corresponding to the values that both differ from the respective baseline values by the respective SAR threshold amounts to the other antenna; and
   in response to both values being different from the respective baseline amounts by at least the respective SAR threshold amounts for both of the first set of values and the second set of values, reduces the power delivered to at least one of (i) the first antenna corresponding to the first set of values; and (ii) the second antenna corresponding to the second set of values, wherein power to an antenna is reduced by an amount corresponding to differences between the respective values and the corresponding baseline values.

14. The device of claim 10, wherein the complex power efficiency parameter is a complex return loss metric.

15. The device of claim 10, wherein the complex power efficiency parameter corresponds to one of a complex reflection coefficient and an impedance.

16. The device of claim 10, wherein the first and second values represent one of (i) magnitude and phase of the complex power efficiency parameter and (ii) real and imaginary values of the complex power efficiency parameter.

17. The device of claim 10, wherein the controller:
   identifies a type identifier for the communication device; and
   determines, using the type identifier, the first and second threshold amounts corresponding to the complex power efficiency parameter.

18. The device of claim 10, wherein the controller:
   detects one or more user configuration inputs; and
   adjusts the power delivered to the first antenna by an amount depending on the user configuration inputs;
   wherein user configuration inputs include activity associated with one or more of: a display; a connector; a headset; a charger; and a proximity sensor.

19. A computer program product comprising computer-executable program code and at least one non-transitory computer-readable storage medium having stored thereon the computer-executable program code, which when executed by a processor of a communication device, causes the communication device to:
   detect, by the on-device measurement receiver of a communication device, a first complex reflected signal corresponding to transmit signals that are reflected by a first antenna;
   determine a first set of values for a complex power efficiency parameter including (i) a first value and (ii) a second value, based on a first complex transmit power signal and the first complex reflected signal;
   determine whether both (a) the first value differs from a first baseline value by at least a first Specific Absorption Rate (SAR) threshold amount and (b) the second value differs from a second baseline value by at least a second SAR threshold amount; and
   in response to determining that the first value and the second value respectively differs from the first and second baseline values by at least the first and second SAR threshold amounts, adjust the power delivered to the first antenna based on respective differences between the first and second values and the first and second baseline values, wherein adjusting the power to the first antenna includes reducing an output power level of a transceiver that delivers power to the first antenna.

20. The computer program product of claim 19, wherein the computer-executable program code further causes the communication device to:
   detect, by the on-device measurement receiver, a second complex reflected signal corresponding to transmit power that is reflected from a second antenna of the communication device;
   compare a second complex transmit power signal to the second complex reflected signal to determine a second set of values for the complex power efficiency parameter, the second set of values including (i) a third value and (ii) a fourth value;
   determine, using the first set of values whether both (i) the first value differs from the first baseline value by at least the first SAR threshold amount and (ii) the second value differs from the second baseline value by at least the second SAR threshold amount;
   determine, using the second set of values whether both (i) the third value differs from a third baseline value by at least the third SAR threshold amount and (ii) the fourth value differs from a fourth baseline value by at least the fourth SAR threshold amount;
   in response to both values being different from the respective baseline amounts by at least the respective SAR threshold amounts for only one of the first set of values and the second set of values, shift power delivered from an antenna corresponding to the values that both differ from the respective baseline values by the respective SAR threshold amounts to the other antenna; and
   in response to both values being different from the respective baseline amounts by at least the respective SAR threshold amounts for both of the first set of values and the second set of values, reduce the power delivered to at least one of (i) the first antenna corresponding to the first set of values; and (ii) the second antenna corresponding to the second set of values, wherein power to an antenna is reduced by an amount corresponding to differences between the respective values and the corresponding baseline values.

* * * * *